May 7, 1946.  B. JOHANSSON  2,399,871
FURNACE
Filed Nov. 27, 1943
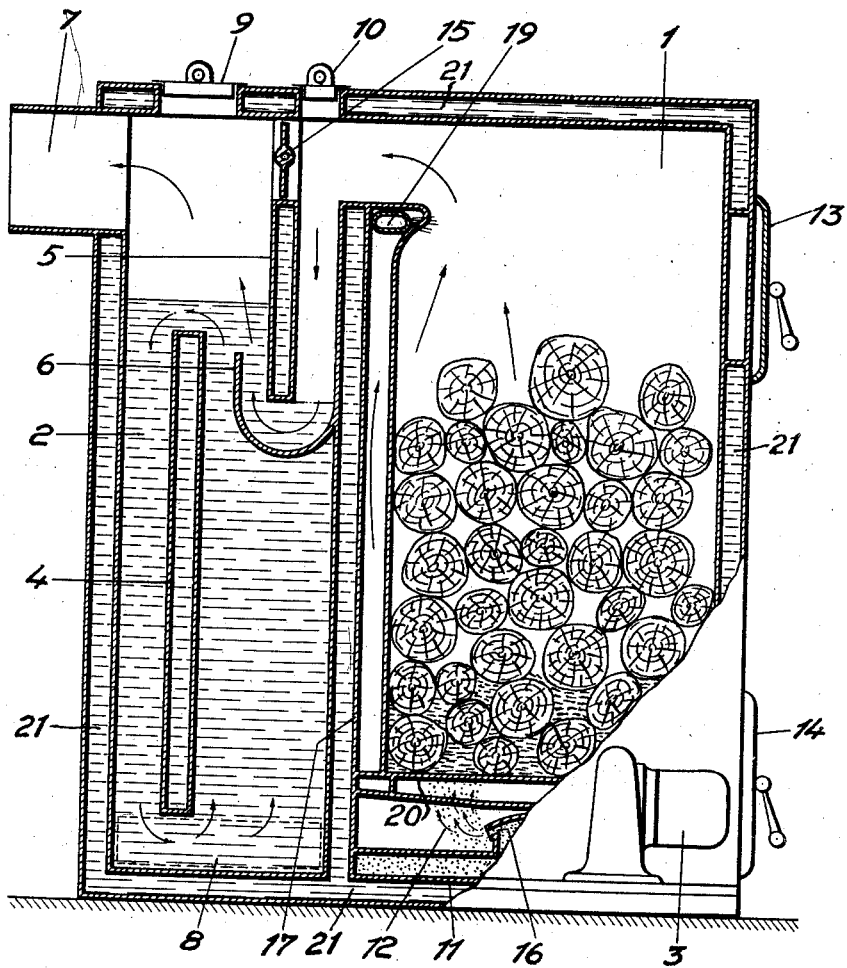
Inventor:
Birger Johansson,
by Pierce & Scheffler,
Attorneys.

Patented May 7, 1946

2,399,871

UNITED STATES PATENT OFFICE 2,399,871

FURNACE

Birger Johansson, Nykoping, Sweden

Application November 27, 1943, Serial No. 512,080
In Sweden November 12, 1942

3 Claims. (Cl. 122—4)

This invention relates to an apparatus for recovering heat and removing soot from hot combustion gases. More particularly, the invention relates to an apparatus comprising a furnace and means for supporting a liquid bath through which the combustion gases are passed on their way to the flue, the passage of the gases through the liquid bath serving not only to recover heat therefrom but also to remove soot and other solid matter in the gases.

When a moist carbonaceous fuel such as wood is burned and the combustion gases are discharged to the flue at a temperature above the boiling point of water, heat is lost not only as sensible heat in gaseous products of combustion but also as heat of vaporization in the water vapor or steam produced by evaporation of the water content of the fuel and in the water vapor produced from the hydrogen content of the fuel.

An object of the invention is to recover the heat of vaporization of this water content of the combustion gases as well as at least a part of the sensible heat of the gases.

The following figures illustrate the amount of heat lost when a fuel is burned without the recovery of the heat content of the combustion gases.

The calorimetric value of pine wood, that is, the amount of heat generated when 1 kg. of dry pine wood is completely burned is 5000 calories but the effective heat value of 1 kg. of dry pine wood without recovery of heat from the combustion gases is only 4700 calories. When the wood contains 20% of water, the effective heat value of 1 kg. is 3600 calories, and when it contains 40% of water, the effective heat value of 1 kg. is only 2600 calories, i. e., only about half of the calorimetric value of dry wood.

In the domestic steam and hot water furnaces in common use only the effective heat value of the fuel is utilized, and since the fuel ordinarily contains more or less water and since the efficiency of such furnaces ordinarily is not greater than about 60%, only a small proportion of the calorimetric value of the fuel is utilized.

By passing the combustion gases in contact with a body of water maintained at a temperature below 100° C., the heat of vaporization of the water content of the gases as well as a portion of the sensible heat of the gases can be recovered. The heat so absorbed in the body of water may be utilized by transferring it through a heat conducting wall to the water of a hot water or steam heating system. The extent of heat saving may be seen from the following. If the heat value of a fuel is 5000 calories per kg. and if the furnace is 60% efficient and if heat is recovered from the combustion gases, then 3000 calories per kg. will be utilized, whereas if the fuel contains 40% moisture and the furnace is 60% efficient and the heat content of the combustion gases is not fully recovered, then the amount of heat utilized will be only 60% of 2600 calories or 1560 calories. Thus about 50% of the available heat is lost.

The invention is illustrated in the accompanying drawing in which the single figure is a vertical section through a furnace designed to heat the water of a hot water heating system.

Referring to the drawing, 1 is the combustion chamber and 2 is the heat recovery apparatus, both being enclosed in a space surrounded by a water jacket 21, the said jacket forming a water heater which may be connected to supply a hot water heating system (not shown). The combustion chamber is provided with the hermetically closable fuel charging door 13 and ash removal door 14. The vertical water wall 17 which communicates with the water jacket 21 forms a partition which separates the combustion chamber from the heat recovery system. As shown, the fuel rests on a grate 20 at the bottom of the combustion chamber and is supplied with combustion air by the blower 3 which draws air through the preheater 11 and discharges it into the ash pit 12 through the nozzle 16. Secondary combustion air may be introduced into the combustion chamber 1 above the fuel bed by means of the air duct 19.

The heat recovery apparatus 2 consists of a well formed by the outer walls of water jacket 21 and the vertical partition wall 17. Within this well is the downwardly projecting baffle or partition 5 which guides the combustion gases from the combustion chamber downwardly through the water in the well, the gases being guided around the submerged end of the baffle 5 by the screen 6. 4 is a partition, the upper end of which is below the level of the liquid in the well and the lower end of which is spaced from the bottom of the well and serves to guide the circulation of the water in the well. The partition 4 and baffle 5 are hollow and connected to the water jacket 21. As will be seen, the movement of the combustion gases through the space between the baffle 5 and the screen 6 will not only effect a cooling and washing of the gases by contact with the water but also will effect a circulatory movement of the water in the well as indicated by the arrows. The washed gases pass out of the apparatus through the flue 7. The well is provided with a clean-out opening 8 for sludge collecting in the well and with openings 9 and 10 for the removal of soot which may collect on the upper surfaces of the well. The damper 15 is provided in the baffle 5 to permit a direct flow of the combustion gases from the chamber 1 to the flue 7 as when the blower 3 is not operating.

The operation of the apparatus will be understood from the foregoing description. Water in the well 2 need be replaced only as it evaporates. It will be kept below its boiling temperature by heat exchange with the water in the jacket 21, the wall 17, the baffle 5 and the partition 4.

It will be apparent that a suction fan on the flue 7 may replace or supplement the action of the blower 3; also that liquids other than water may be used in the well 2.

I claim:

1. A furnace comprising a space enclosed within a water jacket and divided into two chambers by a vertically projecting extension of said water jacket, one of said chambers constituting a combustion chamber provided with an hermetically closable fuel charging door and an hermetically closable ash removal door, the other of said chambers being adapted to contain a washing liquid, means for guiding gases through the washing liquid in said other chamber, a partition defining a passage connecting said two chambers, an outlet from said other chamber for the discharge of gases after they have passed through the washing liquid and means for inducing a flow of gas through a bed of fuel in said combustion chamber, said passage, and said washing liquid to said outlet.

2. A furnace as defined in claim 1 in which the means for guiding gases through the washing liquid comprises a baffle extending downwardly below the normal level of liquid in said chamber, a curved screen extending below the lower end of said baffle for guiding the movement of gas under said baffle through the washing liquid and a partition wall spaced above the bottom of said chamber and below the liquid level in said chamber for guiding the circulation of liquid in said chamber, said baffle and partition wall being hollow and connected to said water jacket.

3. A furnace comprising walls defining a closed space, a partition wall dividing said closed space into a combustion chamber and a second chamber adapted to contain a washing liquid, an opening in said partition wall above the normal level of liquid in said second chamber, a baffle in said second chamber spaced apart from said partition wall and extending downwardly below the normal level of washing liquid therein, said second chamber having a gas outlet above the normal level of washing liquid and on the opposite side of said baffle from said partition wall and means for forcing a gas through said combustion chamber, said opening in the partition wall, around the lower edge of said baffle through said washing liquid and through said outlet.

BIRGER JOHANSSON.